US012578411B2

(12) United States Patent
Alpert et al.

(10) Patent No.: US 12,578,411 B2
(45) Date of Patent: Mar. 17, 2026

(54) PASSIVE RADAR RECEIVER SYSTEM

(71) Applicant: TEXAS INSTRUMENTS INCORPORATED, Dallas, TX (US)

(72) Inventors: Yaron Alpert, Hod Hasharon (IL); Matan Ben-Shachar, D.N. Emek Hefer (IL); Anand Ganesh Dabak, Plano, TX (US); Brian Ginsburg, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 117 days.

(21) Appl. No.: 18/439,335

(22) Filed: Feb. 12, 2024

(65) Prior Publication Data

US 2024/0248162 A1     Jul. 25, 2024

Related U.S. Application Data

(63) Continuation of application No. 17/696,338, filed on Mar. 16, 2022, now Pat. No. 11,933,873.

(51) Int. Cl.
    *G01S 1/04*     (2006.01)
    *G01S 19/25*     (2010.01)
    *G01S 19/30*     (2010.01)

(52) U.S. Cl.
    CPC ............ *G01S 1/045* (2013.01); *G01S 19/254* (2013.01); *G01S 19/30* (2013.01)

(58) Field of Classification Search
    CPC ......... G01S 1/045; G01S 19/254; G01S 19/30
    USPC ....................................................... 375/147
    See application file for complete search history.

(56) References Cited

U.S. PATENT DOCUMENTS

| | | | |
|---|---|---|---|
| 2007/0085658 A1* | 4/2007 | King ................. | G07C 9/00182 |
| | | | 455/420 |
| 2013/0176878 A1* | 7/2013 | Lee ....................... | H04W 24/02 |
| | | | 370/252 |
| 2019/0215930 A1 | 7/2019 | Chen | |

OTHER PUBLICATIONS

Chetty, et al: "Data Processing for Real-Time Wireless Passive Radar"; 2014 IEEE Radar Conference, 2014, pp. 0455-0459, doi: 10.1109/RADAR.2014.6875634.
Högbom: "Aperture Synthesis with a Non-Regular Distribution of Interferometer Baselines", 1974, Astronomy and Astrophysics Suppl. 15, 417-426; 1974A&AS . . . 15..417H.

(Continued)

*Primary Examiner* — Leila Malek
(74) *Attorney, Agent, or Firm* — Michelle F. Murray; Frank D. Cimino

(57) ABSTRACT

One example includes a passive radar receiver system including an RF receiver front-end to receive a wireless source signal and a reflected signal. An antenna switch of the front-end switches a first antenna to a receiver chain during a first time to generate first radar signal data based on a combined wireless signal comprising wireless source signal and the reflected signal, and switches a second antenna to the receiver chain during a second time to generate second radar signal data based on the combined wireless signal. A signal processor generates source signal data associated with the wireless source signal based on the first and second radar signal data and generates reflected signal data associated with the reflected signal based on the first and second radar signal data, and generates target radar data associated with a target based on the source and reflected radar signal data.

20 Claims, 3 Drawing Sheets

(56) References Cited

OTHER PUBLICATIONS

Shan, T., Liu, S., Zhang, Y.D., Amin, M.G., Tao, R. and Feng, Y. (2016), Efficient architecture and hardware implementation of coherent integration processor for digital video broadcast-based passive bistatic radar. IET Radar Sonar Navig., 10: 97-106. https://doi.org/10.1049/iet-rsn.2015.0006.

X. Zhang, J. Swärd, H. Li, A. Jakobsson and B. Himed, "A Sparsity-Based Passive Multistatic Detector," in IEEE Transactions on Aerospace and Electronic Systems, vol. 55, No. 6, pp. 3658-3666, Dec. 2019, doi: 10.1109/TAES.2019.2895710.

Y. Paichard and M. R. Inggs, "Multistatic Passive Coherent Location radar systems," 2009 European Radar Conference (EuRAD), Rome, Italy, 2009, pp. 45-48.

* cited by examiner

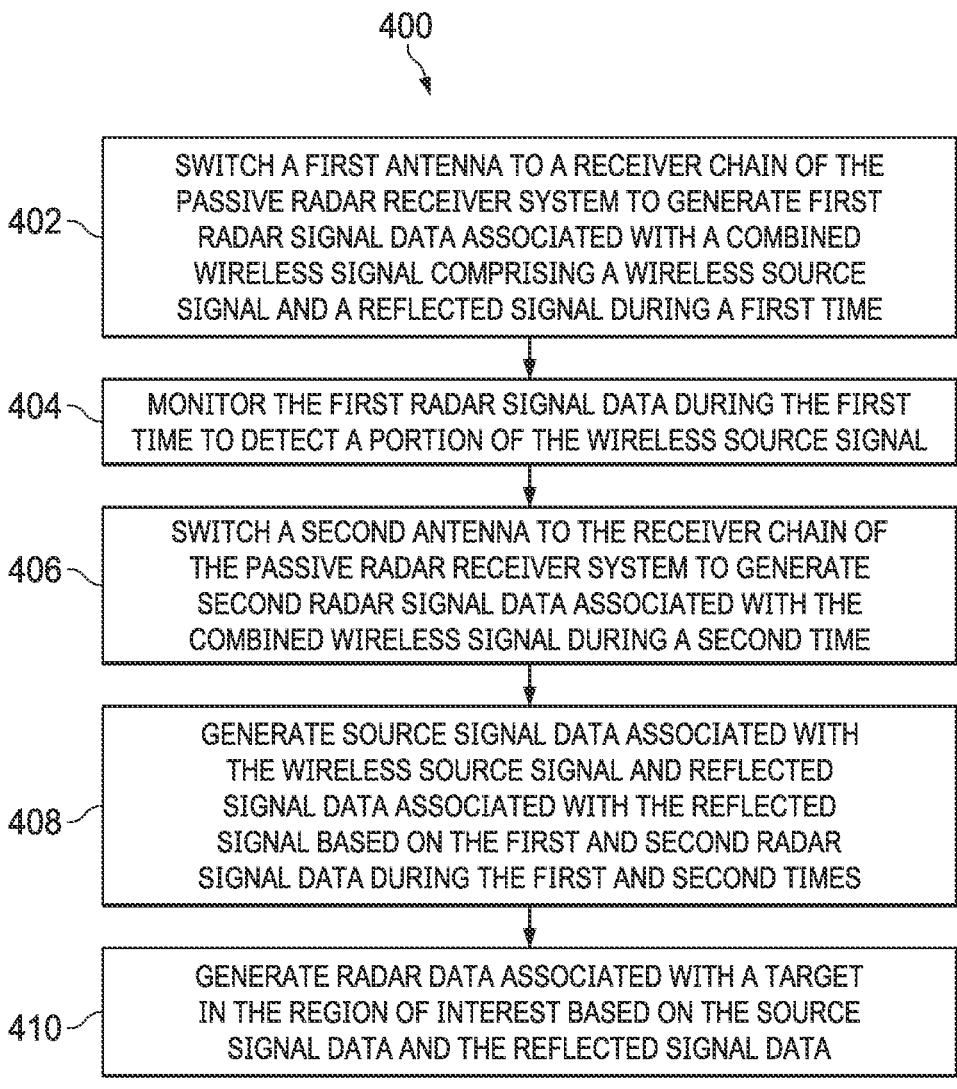

400

402 — SWITCH A FIRST ANTENNA TO A RECEIVER CHAIN OF THE PASSIVE RADAR RECEIVER SYSTEM TO GENERATE FIRST RADAR SIGNAL DATA ASSOCIATED WITH A COMBINED WIRELESS SIGNAL COMPRISING A WIRELESS SOURCE SIGNAL AND A REFLECTED SIGNAL DURING A FIRST TIME

404 — MONITOR THE FIRST RADAR SIGNAL DATA DURING THE FIRST TIME TO DETECT A PORTION OF THE WIRELESS SOURCE SIGNAL

406 — SWITCH A SECOND ANTENNA TO THE RECEIVER CHAIN OF THE PASSIVE RADAR RECEIVER SYSTEM TO GENERATE SECOND RADAR SIGNAL DATA ASSOCIATED WITH THE COMBINED WIRELESS SIGNAL DURING A SECOND TIME

408 — GENERATE SOURCE SIGNAL DATA ASSOCIATED WITH THE WIRELESS SOURCE SIGNAL AND REFLECTED SIGNAL DATA ASSOCIATED WITH THE REFLECTED SIGNAL BASED ON THE FIRST AND SECOND RADAR SIGNAL DATA DURING THE FIRST AND SECOND TIMES

410 — GENERATE RADAR DATA ASSOCIATED WITH A TARGET IN THE REGION OF INTEREST BASED ON THE SOURCE SIGNAL DATA AND THE REFLECTED SIGNAL DATA

FIG. 4

PASSIVE RADAR RECEIVER SYSTEM

CROSS-REFERENCE TO RELATED APPLICATIONS

This application is a continuation of U.S. patent application Ser. No. 17/696,338, filed Mar. 16, 2022 which application is hereby incorporated herein by reference.

TECHNICAL FIELD

This description relates generally to radar systems, and more particularly to a passive radar receiver system.

BACKGROUND

Radar systems operate based on monitoring a baseline signal from a radar transmitter and monitoring a reflected version of the baseline signal, such as reflected from a target object. In a typical radar system, the baseline signal provided from the radar transmitter can be a signal that is dedicated for operation of the radar system, and can implement received signal strength (RSS) and/or channel state information (CSI) to process received signals to generate radar data. However, wireless passive radar systems can implement other signal sources, such as signal sources having a purpose that is not dedicated to radar applications. For example, wireless passive radar systems can implement radio frequency signals that are emitted from television, radio, and/or satellite signals to achieve detection of target objects in a low-cost and more simplistically installed manner.

SUMMARY

One example includes a passive radar receiver system including an RF receiver front-end to receive a wireless source signal and a reflected signal. An antenna switch of the front-end switches a first antenna to a receiver chain during a first time to generate first radar signal data based on a combined wireless signal comprising wireless source signal and the reflected signal, and switches a second antenna to the receiver chain during a second time to generate second radar signal data based on the combined wireless signal. A signal processor generates source signal data associated with the wireless source signal based on the first and second radar signal data and generates reflected signal data associated with the reflected signal based on the first and second radar signal data, and generates target radar data associated with a target based on the source and reflected radar signal data.

Another example described herein includes a method for generating target radar data via a passive radar receiver system. The method includes switching a first antenna to a receiver chain of the passive radar receiver system to generate first radar signal data associated with a wireless source signal and a reflected signal during a first time. The wireless source signal can be generated by a transmitter in a region of interest and the reflected signal can correspond to the wireless source signal having been reflected from a target in the region of interest. The method also includes monitoring the first radar signal data during the first time to detect a portion of the wireless source signal. The method also includes switching a second antenna to the receiver chain of the passive radar receiver system to generate second radar signal data associated with the wireless source signal and the reflected signal during a second time. The method also includes generating source signal data associated with the wireless source signal and reflected signal data associated with the reflected signal based on the first and second radar signal data during the first and second times. The method further includes generating the target radar data associated with the target in the region of interest based on the source signal data and the reflected signal data.

Another example described herein includes passive radar system. The system includes a transmitter configured to generate a wireless source signal in a region of interest. The system also includes an RF receiver front-end to receive a wireless source signal and a reflected signal corresponding to the wireless source signal having been reflected from a target in a region of interest. An antenna switch of the front-end switches a first antenna to a receiver chain during a first time to generate first radar signal data based on a combined wireless signal comprising wireless source signal and the reflected signal, and switches a second antenna to the receiver chain during a second time to generate second radar signal data based on the combined wireless signal. A signal processor generates source signal data associated with the wireless source signal based on the first and second radar signal data and generates reflected signal data associated with the reflected signal based on the first and second radar signal data, and generates target radar data associated with the target based on the source and reflected radar signal data.

BRIEF DESCRIPTION OF THE DRAWINGS

FIG. 4 is an example of a method for generating target radar data via a passive radar system.

DETAILED DESCRIPTION

Figure 1:
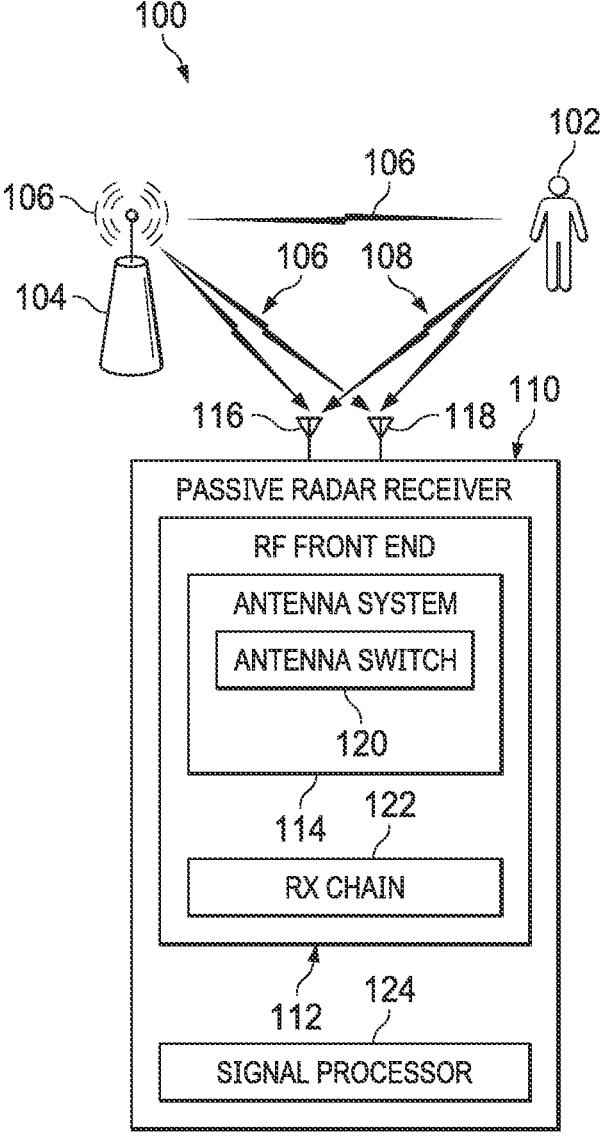
FIG. 1 is an example diagram of a passive radar system.

This description relates generally to radar systems, and more particularly to a passive radar receiver system. The passive radar receiver system can be implemented in a passive radar system that can be implemented to determine target radar data regarding a target in a region of interest based on a wireless source signal provided from a transmitter. As described herein, the term "target radar data" refers to location, range, motion, and/or a variety of other physical characteristic information of the target and/or a transmitter in the region of interest (e.g., time of flight (TOF) distance between the transmitter and the target and/or an angle of arrival (AoA) of the radar signal(s)). The passive radar receiver system can include a radio frequency (RF) receiver front-end that can be configured to receive the wireless source signal and a reflected version of the wireless source signal (hereinafter "reflected signal"). As an example, the wireless source signal can be a wireless communication signal that is implemented in a wireless communication system, such as transmitted from a Wi-Fi communication transceiver. The reflected signal can be reflected from a target in the region of interest. The RF receiver front-end can include an antenna system that includes a plurality of antennas (e.g., a pair of antennas).

The antenna system can be coupled to a receiver chain that is configured to process the received wireless source signal and the reflected signal. The RF receiver front-end includes an antenna switch configured to switch the antennas of the antenna system to the receiver chain at different times. As an example, during a first time, the antenna switch can switch a first antenna to be coupled to the receiver chain, such that a combined wireless signal that includes the wireless source signal and the reflected signal is provided through the receiver chain to generate first radar signal data. During a second time, the antenna switch can switch a second antenna to be coupled to the receiver chain, such that the combined wireless signal that includes the wireless source signal and the reflected signal is provided through the receiver chain to generate second radar signal data. The passive radar receiver system can further include a signal processor that is configured to generate the source signal data associated with the wireless source signal and to generate reflected signal data associated with the reflected signal based on the first and second radar signal data. The signal processor can thus generate the target radar data based on the source signal data and the reflected signal data. As an example, the signal processor can generate a Doppler spectrogram to generate the target radar data based on the source signal data and the reflected signal data.

As another example, the signal processor can be configured to generate a switching signal that is provided to the antenna switch to switch between the first and second antenna. For example, the signal processor can monitor the first radar signal data to identify a portion of the wireless source signal, and can provide the switching signal to the antenna switch in response to identifying the portion of the wireless source signal in the first radar signal data. In the example of the wireless source signal being arranged as a wireless communication signal, the portion of the wireless communication signal can correspond to a physical layer (PHY) preamble or a media access control (MAC) header of the wireless communication signal. As a result, the passive radar receiver system can implement inter-frame switching between the first and second antennas to generate the target radar data. Accordingly, the passive radar receiver system can be arranged in an existing wireless communication system, and can be implemented to generate the target radar data using a single receiver chain on a single passive radar receiver system.

FIG. 1 is an example diagram of a passive radar system 100. The passive radar system 100 can be implemented in a variety of applications in which target radar data, such as range and/or motion information, of a target 102 in a region of interest is desired. In the example of FIG. 1, the target 102 is demonstrated as a person, but the target 102 can be implemented as any of a variety of targets (e.g., animals, vehicles, etc.).

The passive radar system 100 includes a transmitter 104 that is configured to emit a wireless source signal, demonstrated in the example of FIG. 1 generally at 106. As an example, the transmitter 104 can provide the wireless source signal 106 as a directional or illuminating signal, or can provide the wireless source signal 106 as an omni-directional signal. The transmitter 104 can be configured as a wireless communication transmitter, such as a Wi-Fi transceiver, a Bluetooth transmitter (e.g., Bluetooth Low Energy), a cellular base station (e.g., 3GPP), a cellular mobile device, and/or other device that transmits wireless communication signals. In the example of FIG. 1, the wireless source signal 106 propagates to the target 102 and is reflected from the target 102 as a reflected signal 108 corresponding to a reflected version of the wireless source signal 106. The passive radar system 100 also includes a passive radar receiver system 110. The passive radar receiver system 110 can correspond to a fixed or portable unit that can in or can be proximal to the region of interest. As described in greater detail herein, the passive radar receiver system 110 is configured to generate target radar data that can include physical characteristics of the target 102, such as location, range, motion information regarding the target 102, and/or AoA of the wireless source signal and/or the reflected signal.

The passive radar receiver system 110 includes a RF receiver front-end 112 that includes an antenna system 114. The antenna system 114 includes a plurality of antennas that are configured to receive a combined wireless signal that includes both the wireless source signal 106 and the reflected signal 108. In the example of FIG. 1 and as described in greater detail herein, the antennas include a first antenna 116 that is configured to receive the combined wireless signal during a first time, and a second antenna 118 that is configured to receive the combined wireless signal during a second time. As also described in greater detail herein, the antenna system 114 also includes an antenna switch 120 that is configured to switch between the first and second antennas 116 and 118.

The RF receiver front-end 112 also includes a receiver chain ("RX CHAIN") 122 that is coupled to the antenna system 114. The receiver chain 122 is configured to receive and process the combined wireless signal during each of the first and second times. As an example, the receiver chain 122 includes amplifiers and filters and an analog-to-digital converter (ADC) to convert the combined wireless signal to first radar signal data during the first time and to second radar signal data during the second time. The RF receiver front-end 112 further includes a signal processor 124 that is configured to process the first and second radar signal data to generate target radar data associated with the target 102. For example, the signal processor 124 can be configured to generate a source signal data that is associated with the wireless source signal 106 and reflected signal data associated with the reflected signal 108 based on the first and second radar signal data. As an example, the signal processor 124 can generate a Doppler spectrogram based on the source signal data and the reflected signal data, and can generate the target radar data based on the Doppler spectrogram.

As another example, the signal processor 124 can be configured to generate a switching signal that is provided to the antenna switch 120 to switch between the first and second antennas 116 and 118 to monitor the first and second radar signal data. As described above, the transmitter 104 can be a wireless communication transmitter or transceiver, such that the wireless source signal 106 can be a wireless communication signal. Thus, as an example, the signal processor 124 can monitor the first radar signal data to identify a portion of the wireless source signal 106, and can provide the switching signal to the antenna switch 120 to switch from the first antenna 116 to the second antenna 118 in response to identifying the portion of the wireless source signal 106. For example, the portion of the wireless source signal 106 can correspond to a preamble or header of a given frame of the wireless communication signal 106, such as a physical layer (PHY) preamble or a media access control (MAC) header of the wireless communication signal 106.

As an example, the switching from the first antenna 116 to the second antenna 118 can occur during the receipt of the same frame or packet of the wireless source signal 106. For example, the first time and the second time can both occur in their entirety during the receipt of the same frame or packet of the wireless source signal 106. As yet another example, the signal processor 124 can be programmed to identify multiple portions of the wireless source signal 106 (e.g., multiple portions of a given frame or packet) for switching from the first antenna 116 to the second antenna 118 and/or for switching from the second antenna 118 to the first antenna 116, or from the second antenna 118 to a third antenna. Therefore, the antenna switch 120 can switch between the first and second antennas 116 and 118 multiple times or can switch among a set of three or more antennas during a single frame or packet of the wireless source signal 106 (e.g., based on the multiple portions of the wireless source signal 106).

For example, during a first time, the antenna switch 120 can switch the first antenna 116 to be coupled to the receiver chain 122. The first antenna 116 can thus receive the combined wireless signal, which can propagate on the receiver chain 122 to generate the first radar signal data that is provided to the signal processor 124. The signal processor 124 can monitor the first radar signal data during the first time, and in response to identifying the portion of the wireless communication signal 106 (e.g., a frame preamble or packet header) in the first wireless signal data, the signal processor 124 can save the first radar signal data (e.g., in a memory) and can provide the switching signal to the antenna switch 120. As an example, the signal processor 124 drop irrelevant samples as it awaits the portion of the first wireless signal data. In response to the switching signal, the antenna switch 120 can switch from the first antenna 116 to the second antenna 118 to be coupled to the receiver chain 122 during a second time. The second antenna 118 can thus receive the combined wireless signal, which can propagate on the receiver chain 122 to generate second radar signal data that is provided to the signal processor 124. As an example, the signal processor 124 can monitor the second radar signal data during the second time to identify the same portion of the wireless communication signal 106 in the reflected wireless communication signal 108. Therefore, in response to identifying the same portion in the reflected wireless communication signal 108, the signal processor 124 can save the second radar signal data (e.g., in a memory), and can generate the source signal data and the reflected signal data based on the first and second radar signal data. Upon generating the source signal data and the reflected signal data, the signal processor 124 can generate the target radar data based on the source signal data and the reflected signal data.

The preamble or header in the received data packet may be long enough for the signal processor 124 to use a first part of the preamble or header for detection purposes and then record the remainder of the preamble or header. The signal processor 124 may be configured to monitor signals received by the passive radar receiver system 110 for an initial part of a preamble or header. In response to detecting the initial part of a preamble or header, the signal processor 124 may be configured to record the next part of the preamble or header. The signal processor 124 may be configured to then switch the other one of the antennas 116 and 118 to the receiver chain 122 to record a subsequent portion of the data packet (e.g., subsequent to the preamble or header). The signal processor 124 may be configured to generate the target radar data based on the recorded portions of the data packet by, for example, calculating a Doppler spectrogram based on the recorded portions.

Because the passive radar receiver system 110 includes a single receiver chain 122 that is coupled to multiple antennas (e.g., including the first and second antennas 116 and 118) that can be selectively switched to the receiver chain 122, the passive radar receiver system 110 can be implemented more efficiently and more cost effectively than a typical passive radar receiver system. Particularly, typical passive radar receiver systems include multiple receiver chains, with each of the multiple receiver chains including a single antenna to provide an array of antennas and respective receiver chains. Such an arrangement in a typical passive radar receiver system can thus include more hardware, which can be more costly and can occupy a larger form-factor. However, by implementing a single receiver chain 122 that is coupled to multiple antennas (e.g., the first and second antennas 116 and 118) that can be selectively switched to the receiver chain 122, the passive radar receiver system 110 can operate with less hardware, resulting in a smaller and more cost-effective design.

In some examples, passive radar receiver system 110 is part of a device that does not include a transmitter. In other words, the device may not include circuitry for generating signals for transmission, such as an up-converter, transmission amplifier, and/or one or more antennas specifically for transmission. By not including a transmitter, the device may be smaller, less expensive, less complex, and/or less power intensive than another device that includes a transmitter. These characteristics may be desirable for some applications such as internet of things, edge processing, motion sensors, occupancy sensors, and/or other devices that are battery powered, positioned in remote locations, and/or installed in large quantities.

Figure 2:
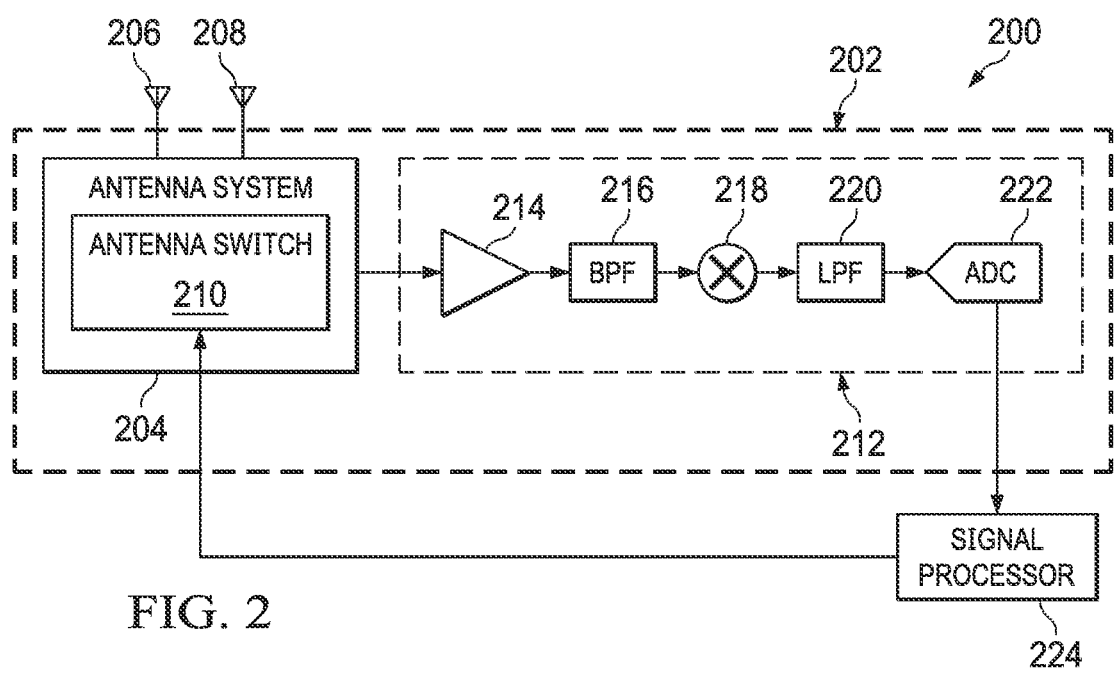
FIG. 2 is an example diagram of a passive radar receiver system.

FIG. 2 is an example diagram of a passive radar receiver system 200. The passive radar receiver system 200 can correspond to the passive radar receiver system 110 in the example of FIG. 1. Therefore, reference is to be made to the example of FIG. 1 in the following description of the example of FIG. 2.

The passive radar receiver system 200 includes a RF receiver front-end 202 that includes an antenna system 204. The antenna system 204 includes a first antenna 206 and a second antenna 208. While the example of FIG. 2 depicts two antennas 206 and 208 in the antenna system 204, the antenna system 204 can include more than two antennas. The antenna system 204 also includes an antenna switch 210 that is configured to switch between the first and second antennas 206 and 208. While the examples of FIGS. 1 and 2 demonstrate only two antennas, multiple antennas can be implemented as described herein, such that the antenna switch 210 can switch sequentially through the individual antennas in each of different respective times.

The RF receiver front-end 202 also includes a receiver chain 212 that is coupled to the antenna system 204 to receive the combined wireless signal corresponding to the wireless source signal and the reflected wireless signal in each of the first and second times. The receiver chain 212 includes a low-noise amplifier 214, a bandpass filter ("BPF") 216, a mixer 218, a low-pass filter ("LPF") 220, and an analog-to-digital converter ("ADC") 222. The low-noise amplifier 214 is coupled to the antenna system 204 and is configured to amplify the combined wireless signal, and the BPF 216 is configured to filter the amplified combined wireless signal to provide a frequency band of interest. The mixer 218 is configured to down convert the filtered and amplified combined wireless signal based on a local oscillator signal LO, such as provided from a frequency synthesizer (not shown in the example of FIG. 2) to generate a downconverter signal. The downconverter signal is thus filtered by the LPF 220 and provided to the ADC 222 to generate the first radar signal data in the first time or the second radar signal data in the second time.

As another example, the mixer 218 can be tuned based on the local oscillator signal LO to tune the passive radar receiver system 200 to a bandwidth of interest within a bandwidth of the associated communication system. In the example of the signal transmitter being implemented in a wireless communication system (e.g., Wi-Fi communications), the wireless communication system can operate across a frequency band that is dictated by the communication standard (e.g., 400 MHZ, 800 MHZ, 5 GHZ, 6 GHZ, etc.). However, based on the local oscillator signal LO, the mixer 218 can tune the passive radar receiver system 200 to a frequency sub-band within the frequency band of the wireless communication system. Therefore, the passive radar receiver system 200 can operate in a number of different frequency bands within a frequency band of the associated wireless communication system.

The passive radar receiver system 200 also includes a signal processor 224. The signal processor 224 is configured to generate the target radar data associated with the target (e.g., the target 102) based on the first and second radar signal data. For example, the signal processor 224 can generate source signal data and reflected signal data based on the first and second radar signal data, and can generate the target radar data based on the source signal data and reflected signal data. As described in greater detail herein, the signal processor 224 can be configured to generate a Doppler spectrogram based on the source signal data and reflected signal data, and can generate the target radar data based on the Doppler spectrogram.

In the example of FIG. 2, the signal processor 224 is configured to generate a switching signal SW that is provided to the antenna switch 210 to switch between the first and second antennas 206 and 208 to monitor the combined wireless signal during the first and second times, respectively. As described above, the signal processor 224 can monitor the first radar signal data to identify a portion of the wireless source signal, and can provide the switching signal SW to the antenna switch 210 to switch from the first antenna 206 to the second antenna 208 in response to identifying the portion of the wireless source signal. In the example of the wireless source signal being a wireless communication signal, the portion of the wireless source signal can correspond to a preamble or header of a given frame of the wireless communication signal, such as a PHY preamble (e.g., long training field (LTF)) or a MAC header of the wireless communication signal. In response to identifying the portion of the wireless source signal, the signal processor 224 provides the switching signal SW to the antenna switch 210 to switch from the first antenna 206 to the second antenna 208, thus ending the first time and beginning the second time. As an example, upon generating the target radar data, the signal processor 224 can provide the switching signal SW to the antenna switch 210 to switch from the second antenna 208 back to the first antenna 206, such as to begin another target radar data collection cycle.

Figure 3:
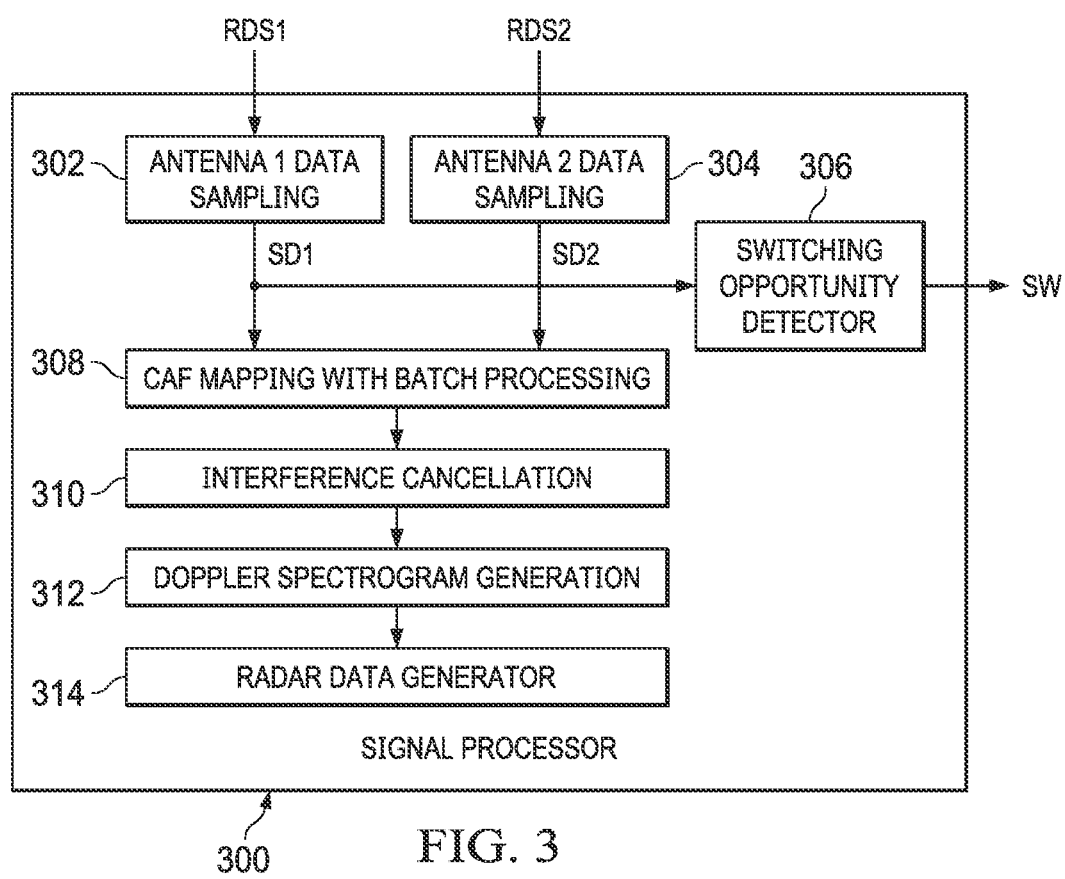
FIG. 3 is an example diagram of a signal processor.

FIG. 3 is an example diagram of a signal processor 300. The signal processor 300 can correspond to the signal processors 124 and 224 in the respective examples of FIGS. 1 and 2. Therefore, reference is to be made to the examples of FIGS. 1 and 2 in the following description of the example of FIG. 3. The signal processor 300 is demonstrated in the example of FIG. 3 as including components that can correspond to hardware, software, firmware, or a combination thereof.

The signal processor 300 includes a first antenna data sampling block ("ANTENNA 1 DATA SAMPLING") 302 and a second antenna data sampling block ("ANTENNA 2 DATA SAMPLING") 304. The first antenna data sampling block 302 is configured to sample the first radar signal data, demonstrated in the example of FIG. 3 as a signal RSD1, that is provided from the ADC 222 in the receiver chain 212 during the first time when the first antenna 206 is coupled to the receiver chain 212. Similarly, the second antenna data sampling block 304 is configured to sample the second radar signal data, demonstrated in the example of FIG. 3 as a signal RSD2, that is provided from the ADC 222 in the receiver chain 212 during the second time when the second antenna 208 is coupled to the receiver chain 212. In the example of FIG. 3, the first antenna data sampling block 302 generates first sampled data SD1 and the second antenna data sampling block 304 generates second sampled data SD2. The first and second sampled data SD1 and SD2 can be implemented by the signal processor 300 for both generating the target radar data, as described herein, and for generating the switching signal SW, as also described herein.

The signal processor 300 also includes a switching opportunity detector 306 that is configured to monitor the first sampled data SD1 to determine when to provide the switching signal SW (e.g., to change a logic state of the switching signal SW). As an example, the switching opportunity detector 306 can be programmed to identify a predetermined pattern or portion of a given frame of a wireless communication signal to determine when to provide the switching signal SW. As described above, the portion of the wireless communication signal can be a PHY preamble or a MAC header of the wireless communication signal (e.g., of a frame of a Wi-Fi communication signal). As another example, the portion of the frame can correspond to a dead area in the packet (e.g., not including useful information or data), or can be a packet that is not directed at or intended for the passive radar receiver system 200. Therefore, during the first time, the switching opportunity detector 306 can monitor the first sampled data SD1 to identify the predetermined portion of the wireless source signal, and can provide the switching signal SW to the antenna switch 210 to switch from the first antenna 206 to the second antenna 208 in response to identifying the predetermined portion of the wireless source signal in the first sampled data SD1. As a result, the switching opportunity detector 306 can facilitate inter-frame switching between the first and second antennas 206 and 208 to generate the target radar data. While the example of FIG. 3 demonstrates that the switching opportunity detector 306 monitors only the first sampled data SD1, the switching opportunity detector 306 could also monitor the second sampled data SD2 (e.g., or other sampled data from additional antennas in third or subsequent times) to provide switching back to the first antenna 206 or another antenna in an array of antennas.

The signal processor 300 also includes a cross-ambiguity function (CAF) batch processing component 308 that is configured to implement a CAF batch processing function on the first and second sampled data SD1 and SD2 after the respective first and second times. The CAF batch processing function can be configured to generate the source signal data and the reflected signal data based on both the first and second radar signal data subsequent to the second time (or subsequent times). The source signal data and the reflected signal data is provided to an interference cancellation component 310 that is configured to implement interference cancellation on the source signal data and the reflected signal data. The interference cancellation can be provided in any of a variety of ways. One example of providing interference cancellation is by implementing the CLEAN algorithm, as described in "Aperture Synthesis with a Non-Regular Distribution of Interferometer Baselines" by Högbom, J. (1974), as provided in *Astrophys. J. Suppl. Ser.*, 15, 417-426 and as given in "Data Processing for Real-Time Wireless Passive Radar," 2014 IEEE radar conference by Kevin Chetty, Bo Tan and Karl Woodbridge, which is incorporated herein by reference in its entirety. Another example by which separation of the source signal data and reflected signal data can be achieved is by antenna nulling between the wireless source signal and the reflected signal, such as given in "Digital Beamforming for Passive Coherent Location Radar" by Malanowski, M. and K. Kulpa (2008) in "Radar Conference," 2008 IEEE, which is incorporated herein by reference in its entirety.

The signal processor 300 also includes a Doppler spectrogram generation component 312 that is configured to generate a Doppler spectrogram based on the source signal data and the reflected signal data. As an example, the Doppler spectrogram generation component 312 can implement a Doppler information extraction method based on the first and second sampled data SD1 and SD2 to generate the Doppler spectrogram. For example, the Doppler spectrogram can be generated by the Doppler spectrogram component 312 based on preamble components, orthogonal frequency division multiplex (OFDM) pilots, and/or sounding elements of the frame associated with the wireless communication signal from which the first and second sampled data SD1 and SD2 are generated. As another example, the Doppler spectrogram can be generated by line-of-sight (LOS) and non-LOS (NLOS) signal processing techniques, such as with direct signal removal within a single frame (e.g., for greater Doppler resolution) or between successive frames. The Doppler spectrogram can result from a cross-correlation algorithm in which cross-correlation signal processing on the first and second sampled data SD1 and SD2 can provide cancellation of the wireless source signal from the reflected signal, such as including LOS cancellation and NLOS cancellation. As an example, residual components of the wireless source signal can be removed from the reflected signal, such as by storing the wireless source signal in the digital domain or by filtering the wireless source signal from the second antenna 208 in the analog domain. The Doppler spectrogram can thus correspond to a difference in between the wireless source signal and the reflected signal. As another example, the phase or frequency shift of the pilots of the first and second sampled data SD1 and SD2 can be implemented for AoA, channel state information (CSI), or Doppler estimations.

The signal processor 300 further includes a radar data generator 314 that is configured to generate the target radar data associated with the target. As described above, the target radar data can include location, range, motion, and/or a variety of other physical characteristic information of the target and/or a transmitter in the region of interest (e.g., time of flight (TOF) distance between the transmitter and the target). As an example, the radar data generator 314 can provide per frame and/or multi frame generation and reporting of the target radar data, and can be combined with assisted intonation to report the Doppler spectrogram and/or other target parameters. For example, Doppler resolution can be improved by using protocol side information, such as time-of-flight (TOF), AoA, location, CSI, or other factors, acquired in parallel measurements. Accordingly, as opposed to a typical radar system that can implement received signal strength (RSS) and/or CSI to process received signals to generate target radar data, the signal processor 300 can generate the Doppler spectrogram to generate the target radar data associated with the target.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 400 for generating target radar data via a passive radar receiver system (e.g., the passive radar receiver system 110). The method 400 is described with reference to signal processors 124, 224, and 300 shown in FIGS. 1-3, although other entities or components may exemplify similar techniques.

At 402, signal processor 124, 224, and/or 300 switches a first antenna (e.g., the first antenna 206) to a receiver chain (e.g., the receiver chain 122) of the passive radar receiver system to generate first radar signal data (e.g., the first radar signal data RSD1) associated with a combined wireless signal comprising a wireless source signal (e.g., the wireless source signal 106) and a reflected signal (e.g., the reflected signal 108) during a first time. The wireless source signal can be generated by a transmitter (e.g., the transmitter 104) in a region of interest. Signal processor 124, 224, and/or 300 may be configured to parse the combined wireless signal received by the passive radar receiver system to determine data encoded in the wireless source signal. The data encoded in the wireless source signal may include one or more of any or all of the following: a header, a preamble, a payload, an integrity code, and an error-detecting code.

At 404, signal processor 124, 224, and/or 300 monitors the first radar signal data during the first time to detect a first portion of the wireless source signal. Signal processor 124, 224, and/or 300 may be configured to monitor data in the wireless source signal to determine which portion of the wireless source signal is being received by the passive radar receiver system. As an example, signal processor 124, 224, and/or 300 can determine that an initial portion (e.g., a preamble or a header) of a message is being received based on the data encoded in the wireless source signal.

At 406, signal processor 124, 224, and/or 300 switches a second antenna to the receiver chain of the passive radar receiver system to generate second radar signal data (e.g., the second radar signal data RSD2) associated with the combined wireless signal during a second time. Signal processor 124, 224, and/or 300 may be configured to switch the second antenna to the receiver chain in response to detecting the first portion of the wireless source signal. For example, signal processor 124, 224, and/or 300 can switch the second antenna to the receiver chain in response to determining that the passive radar receiver system has received an initial portion (e.g., a preamble or header) of a message. In response to determining that passive radar receiver system has received the ending of a preamble or header, signal processor 124, 224, and/or 300 may be configured to switch the antenna to the receiver chain.

At 408, signal processor 124, 224, and/or 300 generates source signal data associated with the wireless source signal and reflected signal data associated with the reflected signal based on the first and second radar signal data during the first and second times. For example, signal processor 124, 224, and/or 300 may be configured to a generate a Doppler spectrogram by extracting the Doppler shift from the reflected signal data.

At 410, signal processor 124, 224, and/or 300 generates the target radar data associated with a target in the region of interest based on the source signal data and the reflected signal data. To generate the radar data, signal processor 124, 224, and/or 300 may be configured to determine the location, velocity, size, and/or shape of the target from which the reflected signal was received by the antennas.

In this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor wafer and/or integrated circuit (IC) package) and may be configured to couple to at least some of the passive elements and/or the sources to form the described structure, either at a time of manufacture or after a time of manufacture, such as by an end user and/or a third party.

This disclosure has attributed functionality to signal processors 124, 224, and 300. Signal processors 124, 224, and 300 may include one or more processors, any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources. In some examples, signal processors 124, 224, and 300 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

Modifications are possible in the described embodiments, and other embodiments are possible, within the scope of the claims.

What is claimed is:

1. A device comprising:
a receiver chain; and
a processor configured to:
    receive first data associated with a first antenna via the receiver chain,
    detect a first portion of a wireless source signal based on the first data,
    in response to detecting the first portion, provide a switching signal to receive second data associated with a second antenna via the receiver chain, and
    generate a radar image based on the first and second data.

2. The device of claim 1, wherein the wireless source signal is a wireless communication signal.

3. The device of claim 2, wherein the wireless communication signal is a WiFi signal.

4. The device of claim 2, wherein the wireless communication signal is a Bluetooth signal.

5. The device of claim 2, wherein the wireless communication signal is a cellular signal.

6. The device of claim 2, wherein detecting the first portion of the wireless source signal comprises detecting a preamble of the wireless communication signal.

7. The device of claim 2, wherein detecting the first portion of the wireless source signal comprises detecting a long training field (LTF) of the wireless communication signal.

8. The device of claim 2, wherein detecting the first portion of the wireless source signal comprises detecting a media access control (MAC) header of the wireless communication signal.

9. The device of claim 2, wherein the wireless source signal is not directed to the device.

10. The device of claim 2, wherein the processor is configured to generate the radar image based on a preamble component of the wireless communication signal.

11. The device of claim 2, wherein the processor is configured to generate the radar image based on orthogonal frequency division multiplex (OFDM) pilots of the wireless communication signal.

12. The device of claim 2, wherein the processor is configured to generate the radar image based on sounding elements of a frame associated with the wireless communication signal.

13. The device of claim 1, wherein the receiver chain is configured to:
receive the first portion of the wireless source signal via the first antenna;
generate the first data based on the first portion of the wireless source signal; and
responsive to the switching signal:
    receive a second portion of the wireless source signal via the second antenna, and
    generate the second data based on the second portion of the wireless source signal.

14. The device of claim 13, wherein the first and second portions of the wireless source signal correspond to a single frame according to a communication protocol.

15. The device of claim 13, further comprising an antenna switch having a first antenna terminal, a second antenna terminal, and an output coupled to the receiver chain, wherein the antenna switch is configured to:
during a first time, provide the wireless source signal from the first antenna terminal to the receiver chain; and responsive to the switching signal, provide the wireless source signal from the second antenna terminal to the receiver chain.

16. The device of claim 15, further comprising:

the first antenna coupled to the first antenna terminal; and the second antenna coupled to the second antenna terminal.

17. The device of claim 1, wherein the radar image comprises a radar spectrogram.

18. The device of claim 1, wherein the device does not comprise a wireless transmitter.

19. The device of claim 1, wherein the processor is configured to implement cross-ambiguity function (CAF) batch processing on the first and second data to generate the radar image.

20. The device of claim 1, wherein the wireless source signal is a combined wireless signal comprising a first wireless source signal and a reflected wireless source signal.

\* \* \* \* \*